Patented July 8, 1930

1,770,360

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

COMPOSITION OF MATTER

No Drawing. Application filed November 7, 1927. Serial No. 231,786.

My invention relates to a composition of matter comprising a waterproof binder and a rubber-containing shrub, or the rubber in an unprepared state obtained from a rubber-containing shrub.

My invention relates to a homogeneous mixture, a heterogeneous mixture, a substantial thickness of the body structure to be formed with reinforcing means, and the composition itself.

My invention relates to a composition, or mixture, or constructional material formed out of said mixture and the process of mixing and forming the material. The constructional material may be roofing sheets, floor covering, rail filler, expansion joints, premolded sewer pipe belts, plastic tubing, flashing blocks, paving blocks, insulation brick, in fact any article of manufacture which can be created from this composition.

My invention relates to a mixture of waterproof binder and shredded guayule shrub, the plant from which guayule rubber is obtained being the *Parthenium argentatum*.

The object of my invention is to produce an economically formed article of manufacture which has greater elasticity than ordinarily waterproofed materials formed thru the mixing of fibrous material and a waterproof binder, where the waterproof binder must first be mixed with shredded fibrous material and then with other, reclaimed, crude, or scrap rubber. The old process is a triple process and greatly extended, as first the binder, then the shredded fibrous material must be prepared, and the rubber must either come thru the utilization of manufactured rubber, prepared crepe, coagulated rubber secured from uncoagulated latex or reclaimed rubber.

There are also other shrubs which are rubber-containing, in which the rubber is present in the plant in a coagulated state, or where the rubber can be coagulated in the plant by shredding the rubber containing shrub or plant. I, therefore, do not wish to be limited to the particular shrub enumerated, but to any shredded fibrous material or rubber containing plant in which the rubber has coagulated.

This shrub is native to Mexico, Southern California and Texas, and other rubber bearing shrubs are native to Mexico and the United States. There are other rubber containing shrubs in other parts of the world.

My invention does not relate to the shredding of the rubber containing shrub as such shredders are already on the market. Such shredder is shown in the attached photostat.

My invention has to do with the mixture of the shredded material in its various stages. The waterproof binder may be a binder, such as, road white, blown asphalt, bituminous binders, rubber-resin binders, in fact any waterproof binder which may be suitable for construction purposes. The material which is mixed with this binder will be this rubber containing shrub. Much of the shrub will be in shredded form and much loosely obtained coagulated rubber particles may be apparent in the mixture, it being the object of my invention to impart to this constructional material rubber-like qualities without taking the rubber thru the various expensive steps heretofore employed. The bales from the field are opened and the shrub fed thru shredders and the shredded mass is floated in water thru skimming tanks, where the rubber and light bark float and the heavy wood fiber sinks, so that there may be four steps involved in this invention, viz, the rubber containing shrub may simply be fed thru corrugated rolls or crushing rolls, and the resultant mass further shredded or cut into desired form, and this material mixed with waterproof binder, or the rubber particles which float upon the water may be used in a mixture with the waterproof binder, or the bark which floats on the surface with the rubber may be used with the waterproof binder, or the wood fiber which sinks in the floating process may be used as a mixture in combination with a waterproof binder.

It may be desirable not to utilize the material in any kind of a premoistened or wet state, but to utilize it in its natural state after crushing and grinding. If the material has length and linear dimension then its binding qualities will be greater than if it is merely in a simple granulated form. The rubber content may be left in the wood or the bark where it is dominant, and utilized in that fashion, or the separated rubber may be utilized in combination with the bark or with the wood or bagasse which is left after extracting the rubber, or this combination of materials may be used either individually or collectively with other linear fibers, such as, felt, cotton, hemp, flax, sisal, cocoanut fiber, animal fiber, in fact any vegetable or animal fiber having linear dimension. Mineral matter, such as limestone dust, slate particles, barytes, fuller's earth, clay, or other mineral materials may be utilized in modified proportions, preferably not exceeding five or ten per cent. The proportion of fiber in the mixture will approximate anywhere up to fifty per cent. In most cases it will be desirable to make the mixture with the waterproof binder at least preponderating, but I do not wish to be limited to a preponderance of binder as there may be a greater percentage of the rubber containing shrub than the waterproof binder, depending upon how hard and tough the article is to be made. My invention comprises a mixture composed of any one of the various parts of a rubber containing shrub as long as the rubber particles have not been milled or prepared in slab form for the market, i. e. the parts being as derived from the shredding or separating process. In the final analysis of the process of separating the rubber, salt is added to the water and the bark then sinks and the rubber particles float, so that it can be readily seen that in the various processes most all of the physical part of the rubber-containng shrub can be separated and utilized in its distinct variations.

Likewise the plant may be separated thru chemical processes in which the rubber may be separated out from the plant thru a causticizing process or solvent, in which the shrub proper may be softened and be better adapted to mixtures.

I am not particularly concerned with the process of separating out the parts or the means utilized in separating out the rubber containing shrub, my invention being in utilizing a rubber containing shrub in a mixture which obtains the advantages of the rubber without going thru the expensive process of first forming the rubber into crepe or slabs for the market, and is a distinctly more basic process than shredding old rubber tires or mixing reclaimed rubber with waterproof binder, which I disclaim in this invention, although reclaimed rubber and old shredded rubber may be added as part of the compounding ingredients.

I preferably dissolve the waterproof binder and add the rubber-containing shrub with other ingredients in suitable mixing devices and mix the rubber-containing shrub or any one of its component parts with the waterproof binder. The waterproof binder may be either in a heated liquid state or in a plastic state. Regardless of the extraction of the rubber many of the rubber particles will remain in the refuse bark or woody particles of the plant.

The contents of the guayule shrub varies in its rubber content from eight to ten or twelve per cent of refined rubber. The plant cannot be tapped and the plant is separated into its component parts by maceration in water, this being the preferred method.

Where the rubber content of the shrub is not sufficient for the required purposes additional crude reclaimed or other rubbers may be added. It can be readily appreciated that the rubber obtained by incorporating fibrous elements or ingredients of a rubber containing shrub that this product may be prepared more economically than where only new rubber or expensively treated reclaimed rubbers are used exclusively.

The composition of matter will have some of the qualities of rubber, will have fibrous reinforcement and will be incorporated in a waterproof binder, imparting qualities to construction material which can be obtained extremely economically and without first resorting to expensive processes of preparation of the raw material.

The shrub *Parthenium argentatum* is indigenous to Mexico, and is raised successfully in Texas and California, and no doubt can be grown successfully in other parts of the United States.

The guayule rubber is unique in that it exists in the shrub as such and not in the form of latex. The rubber occurs in the cells of the tissues of the root and stem, and is present to the extent of about ten per cent of the whole plant.

Three methods have been suggested for the separation of the rubber:

(1) The plant may be treated by boiling with caustic soda solution whereby the cellular tissues are destroyed and the rubber set free.

(2) Extraction of the rubber from the macerated shrub by means of a solvent.

(3) Mechanical treatment of the shrub in a pebble mill or ball mill in the presence of water, whereby the cellular matter is disintegrated.

A fourth method or process may be by merely presenting the shrub to pressure rolls whereby fibrous material is crushed, and this material may later be presented to shredders which will further divide the rubber containing fibrous material.

I do not wish to be limited to the particular part of the plant utilized, as I may utilize one or all parts in different proportions, determined by experiment for the purpose required.

The mixture may be presented in a plastic or flowable state to pressure means, rolls, belted rolls, extrusion machines, either individually or in combination, and thru such means formed into constructional material and different articles of manufacture.

I do not claim the process of separating the materials but claim the process of mixing a waterproof binder with one or more of the component parts of a rubber bearing shrub, the process consisting of heating the waterproof binder, incorporating in said binder as one of the compounding ingredients component parts of a rubber bearing shrub and then presenting said mixture to pressure and forming thereby a constructional material or other articles of manufacture.

A formula suitable for the preparation of this material would comprise blown bituminous material of a ductile nature seventy-five per cent, shredded rubber containing shrub fifteen per cent, rubber granules obtained from a rubber containing shrub ten per cent. Another formula would be any suitable binder having considerable body eighty per cent, and shredded rubber containing shrubs twenty per cent. Another formula may be any suitable waterproofing binder having body sixty-five per cent, rubber particles derived from rubber-bearing shrub five per cent, fibrous material secured from rubber-bearing shrub twenty per cent and bark derived from rubber-bearing shrub five per cent. These formulas are broadly given and show a preponderant binder. Other mixtures may be made in which the binder is not preponderant, but in which the other ingredients approximate fifty per cent and the binder fifty per cent, or still other formulas may be devised which show the binder as forty per cent and the other compounding ingredients as sixty per cent.

A suitable procedure in preparing the constructional material would be to heat the liquid binder, incorporating therein the foreign ingredients in successive stages, the liquid binder becoming a heated, flowable, plastic as the material is added, and this material could then be presented to suitable pressure means and formed into constructional material.

The composition of matter may be molded, pressed, rolled or otherwise formed into construction material. On the other hand a plastic binder may be utilized and the ingredients of the rubber-bearing shrub may be incorporated while the binder is in a plastic state and prepared in suitable devices, thoroughly mixed and presented to pressure or forming means. Where the binder has been in a liquid state it would of course be reduced to a plastic state and the fiber will be incorporated in the mixing and thoroughly mixed in suitable mixing devices before being presented to molds, pressure means, rolls or other forming devices.

Another formula would be a tough waterproof binder seventy-five per cent, rubber particles derived from a rubber-containing shrub ten per cent, bark derived from a rubber containing shrub ten per cent and linear fibers five per cent.

I claim:

1. A composition of matter having a rubber-like character comprising an intermixed mass of bituminous material and the component parts of a rubber-bearing shrub.

2. A composition of matter having a rubber-like character comprising an intermixed mass of bituminous material and a macerated rubber-bearing shrub.

3. A composition of matter having a rubber-like character comprising an intertwined mass of bituminous material, a macerated rubber-bearing shrub, and relatively long fibrous material.

4. A composition of matter having a rubber-like character comprising an intermixed mass of bituminous material, a macerated rubber-bearing shrub, relatively long reenforcing fibrous material, and mineral matter.

5. A construction block of rubber-like character comprising a body of bituminous binder in which is incorporated a macerated rubber-bearing shrub.

6. A construction block of rubber-like character comprising a body of bituminous binder in which is incorporated a macerated rubber-bearing shrub and relatively long reenforcing fibrous material.

7. An expansion joint strip of rubber-like character comprising a mixture of bituminous binder and a macerated rubber-bearing shrub.

8. An expansion joint strip of rubber-like character comprising a mixture of bituminous binder, a macerated rubber-bearing shrub and relatively long reenforcing fibrous material.

Signed at Chicago, Illinois, this 4th day of November, 1927.

ALBERT C. FISCHER.